United States Patent
Franzolin

(10) Patent No.: US 10,054,317 B2
(45) Date of Patent: Aug. 21, 2018

(54) FOOD COOKING OVEN WITH A DEVICE FOR DISTRIBUTING WATER INSIDE THE COOKING CHAMBER OF THE OVEN, FOR PRODUCING STEAM INSIDE THE CHAMBER

(71) Applicant: UNOX S.p.A., Cadoneghe (IT)

(72) Inventor: Enrico Franzolin, Cadoneghe (IT)

(73) Assignee: UNOX S.P.A., Cadoneghe (PD) (IT)

( * ) Notice: Subject to any disclaimer, the term of this patent is extended or adjusted under 35 U.S.C. 154(b) by 531 days.

(21) Appl. No.: 14/845,950

(22) Filed: Sep. 4, 2015

(65) Prior Publication Data
US 2016/0069572 A1   Mar. 10, 2016

(30) Foreign Application Priority Data
Sep. 8, 2014   (IT) .............................. PD2014A0229

(51) Int. Cl.
*F24C 15/32* (2006.01)
*F24C 15/00* (2006.01)
(Continued)

(52) U.S. Cl.
CPC ............... *F24C 15/325* (2013.01); *A21B 1/24* (2013.01); *A21B 1/26* (2013.01); *F24C 15/003* (2013.01); *F24C 15/327* (2013.01)

(58) Field of Classification Search
None
See application file for complete search history.

(56) References Cited

U.S. PATENT DOCUMENTS 4,189,995 A   2/1980   Lorh et al.
6,619,189 B1 *  9/2003  Tippmann .............. A23L 3/00
                                                   126/20

(Continued)

FOREIGN PATENT DOCUMENTS

EP   0000908 A1   3/1979
EP   1310742 A2   5/2003

OTHER PUBLICATIONS

"ChefLux UNOX", Jul. 1, 2014 (Jul. 1, 2014), pp. 5-5, XP055190146, Retrieved from the Internet: URL: http://www.feffer.co.il/wp-content/uploads/2014/11/Cheflux-ENG.pdf [retrieved on May 19, 2015] & "Exploded view MOD: XV893 Unox", Apr. 19, 2012 (Apr. 19, 2012). XP055190151, Retrieved from the Internet: URL: http://emga.com/files/596744 ev ol 2012.pdf [retrieved on May 19, 2015].

*Primary Examiner* — Joseph M Pelham
(74) *Attorney, Agent, or Firm* — Volpe and Koenig, P.C.

(57) ABSTRACT

A food cooking oven includes a device for distributing water inside the cooking chamber of an oven for producing steam inside the cooking chamber, at least a first and a second impeller of corresponding electric fan units positioned, respectively, vertically one above the other, heating means for generating heat inside the cooking chamber, at least one water supply line in the intake area of each corresponding fan impeller, and a water supply conduit. At least one flow deflector device is provided in the oven, which divides the flow of water into at least a first and a second outgoing flow from the deflector, having respective predetermined values, the first outgoing flow from the deflector being guided into the intake area of the first impeller, and the second outgoing flow being guided along the second portion of conduit towards the intake area of the second impeller.

7 Claims, 5 Drawing Sheets

(51) Int. Cl.
*A21B 1/24* (2006.01)
*A21B 1/26* (2006.01)

(56) References Cited

U.S. PATENT DOCUMENTS

| | | | | |
|---|---|---|---|---|
| 2004/0261632 A1* | 12/2004 | Hansen | ............. | A21B 3/04 |
| | | | | 99/468 |
| 2006/0011607 A1* | 1/2006 | Cho | ............. | F24C 15/327 |
| | | | | 219/401 |
| 2008/0237213 A1* | 10/2008 | Bujeau | ............. | A21B 3/04 |
| | | | | 219/401 |
| 2012/0103318 A1* | 5/2012 | Kaiser | ............. | F24C 15/327 |
| | | | | 126/20 |

* cited by examiner

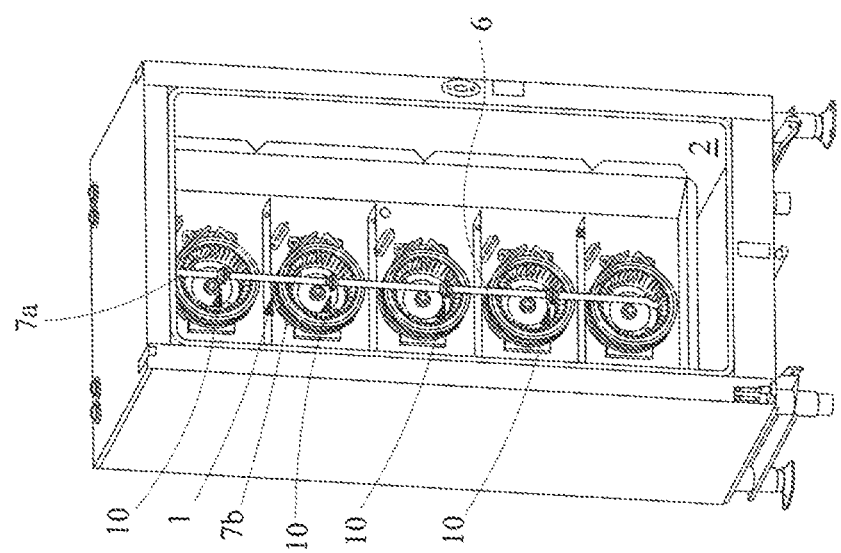

FOOD COOKING OVEN WITH A DEVICE FOR DISTRIBUTING WATER INSIDE THE COOKING CHAMBER OF THE OVEN, FOR PRODUCING STEAM INSIDE THE CHAMBER

FIELD OF THE INVENTION

The present invention relates to a cooking oven including a device for distributing water inside the cooking chamber of the oven, for producing steam.

In particular, the invention lies within the specific technical field of food cooking ovens in which steam production for cooking takes place inside the oven, and provides systems for atomizing water injected into the cooking chamber to facilitate the subsequent evaporation caused by the temperature of the oven and/or by heating means.

BACKGROUND

In a known atomizing system, water is introduced directly into the intake area of the fan, which is typically provided in the form of a fan with radial blades of the two-way type, designed to be operated in both directions of rotation in the execution of specified cooking cycles.

The aforesaid system provides for the supply of a flow of water at a predetermined rate to a position near the intake area of the fan, in such a way that, owing to the speed of the air and/or of the steam drawn in by the fan, this flow of water entering the intake area is distributed fairly uniformly over the inner surfaces of the blades, which, rotating at high speed (typically 1000 to 3000 revolutions per minute with a power supply frequency of 50 Hz), are able to atomize the flow.

The heating of the cooking chamber facilitates the subsequent evaporation of the atomized flow produced by the impact of the water on the fan blades. In this context, a typical application provides for the use of electrical resistances in the form of heating cables extending in coaxial configurations with the fan so as to cover the length of the blades and promote the exchange of heat with the air which carries the atomized flow of water into the delivery area of the fan, thereby facilitating the generation of steam inside the cooking chamber. Other applications provide for the use of combustion gas/air heat exchangers.

In cooking ovens where a plurality of fans are present, with respective associated heating means, and are typically provided in vertical superimposition on one another, it is necessary to supply water to each fan at substantially the same flow rate, subject to any tolerance on the flow rate values considered to be acceptable, to provide uniform temperature conditions inside the cooking chamber. In known systems, in which each fan is associated with a respective and distinct supply conduit, a tolerance of +/−20% in the flow rate values of each conduit is usually considered acceptable.

In the evaporation process the latent heat of evaporation of the water is very high, and, since the atomized water evaporation process is substantially adiabatic, it causes a substantial reduction in the air temperature when it takes place; if there are non-uniformities in the water flows which are atomized in the fans, there will be outgoing air flows at different temperatures, although these are still considered acceptable within the limits of the aforesaid tolerance. The aforementioned known solution meets this requirement by providing each fan with a respective water supply conduit, separate and distinct from the other conduits, on which flow rate control elements are provided; said elements may comprise calibrated apertures or proportional valves for controlling the flow rate. All of these arrangements are intended to ensure that each fan is struck by the same flow of water, subject to the accepted tolerances, to provide a substantial uniformity of steam generation so as to ensure uniform cooking conditions for the food present in the cooking chamber. Evidently, as the number of fans in the cooking chamber increases (applications using as many as five fans are commonly found in ovens for public catering), the water distribution system to be provided becomes more complicated, both because of the number of components and their overall dimensions, resulting in an increase in the associated costs (partly due to the amount of equipment required), and because of the overall layout of the system, given that each supply conduit, with its corresponding flow rate control elements, must also be connected to a common external supply source.

The fundamental problem of the present invention is that of providing a cooking oven with a device for distributing water for steam production inside the cooking chamber whose structural and functional design is such that the limitations of the aforementioned prior art can be overcome.

SUMMARY

This problem is resolved by the invention by means of a cooking oven made in accordance with the following claims.

BRIEF DESCRIPTION OF THE DRAWINGS

Other features and advantages of the invention will become clear from the following detailed description of a preferred example of embodiment thereof, illustrated, purely for guidance and in a non-limiting way, by the attached drawings, in which:

FIG. 5 is a perspective view, corresponding to that of FIG. 1, of an oven according to the invention in a different version, fitted with five fans.

DETAILED DESCRIPTION OF THE PREFERRED EMBODIMENTS

With reference to the aforesaid figures, the number 1 indicates the whole of a water distribution device designed for use in a cooking chamber 2 of an oven 3 for food, the last two elements being shown only in a schematic and partial way. The device forms part of a system designed for producing steam inside the cooking chamber, as will be made clear in the remainder of the description.

Figure 1:
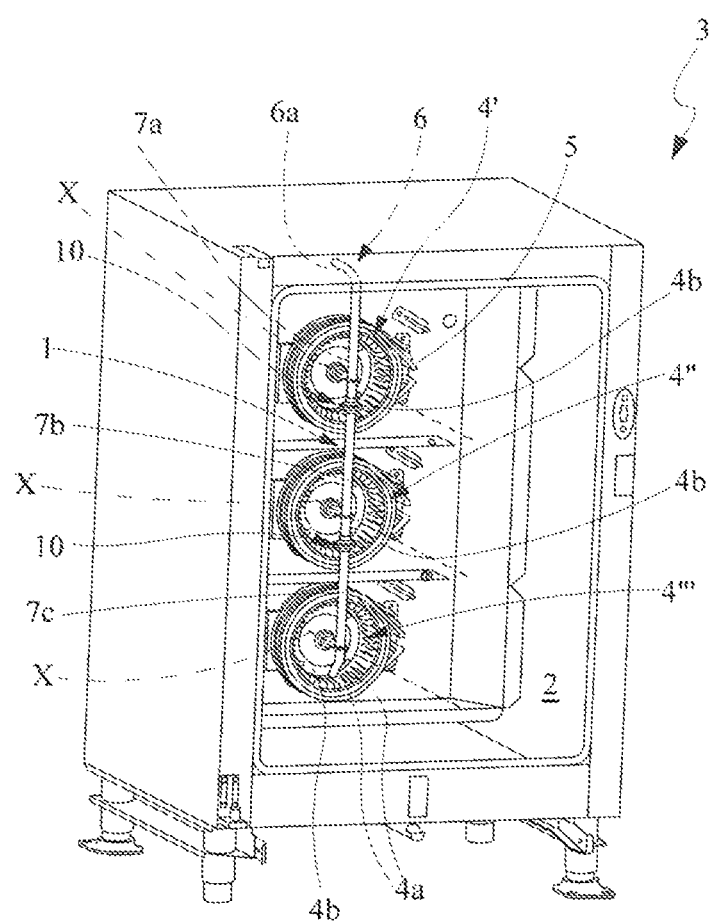
FIG. 1 is a perspective view of an oven fitted with a device for distributing water inside the oven, made according to the invention.
Figure 6:
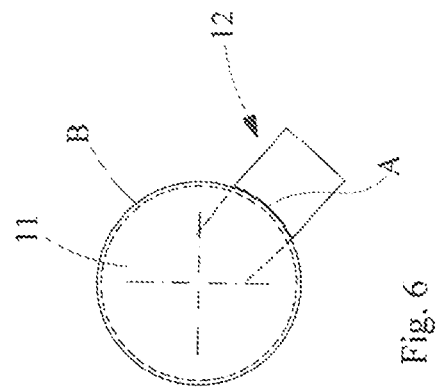
FIG. 6 is a schematic view of a detail of the device of the preceding figures.
Figure 2:
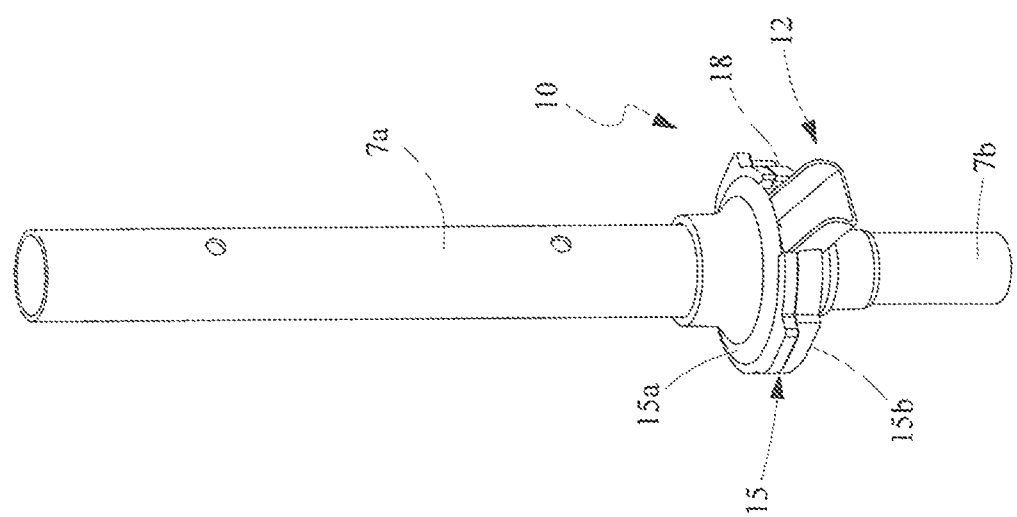
FIG. 2 is a perspective view of a detail of the device shown in FIG. 1.
Figure 3:
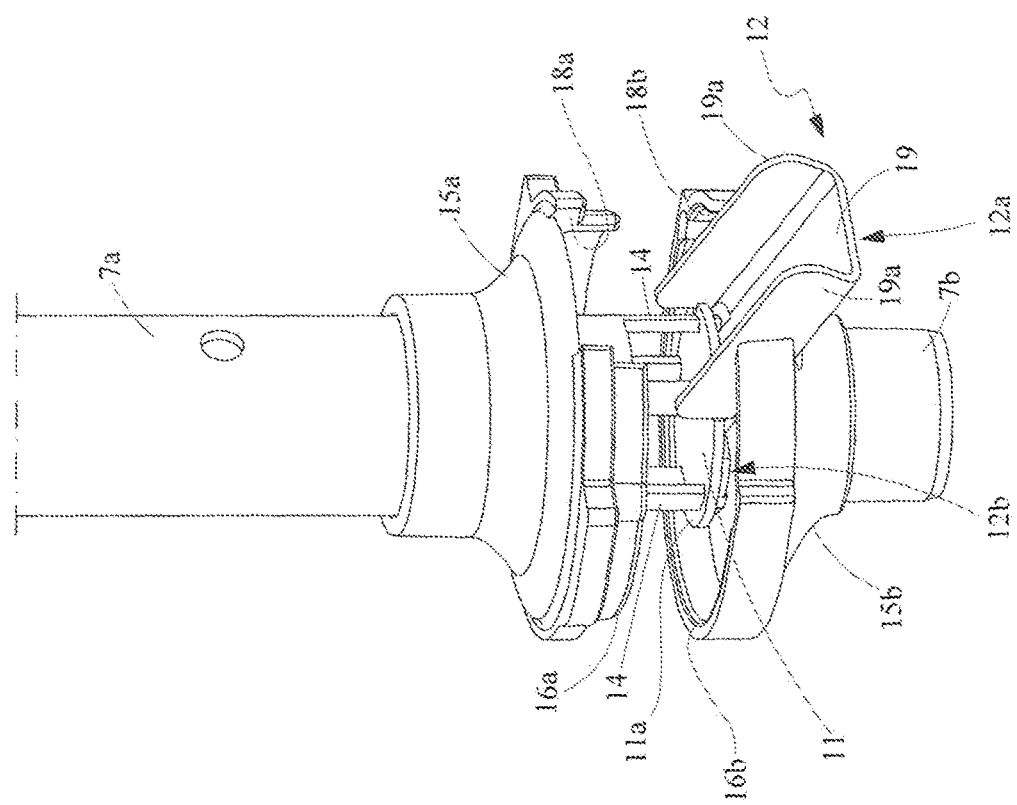
FIG. 3 is an enlarged perspective view, with some parts detached, of the detail of FIG. 2.
Figure 4:
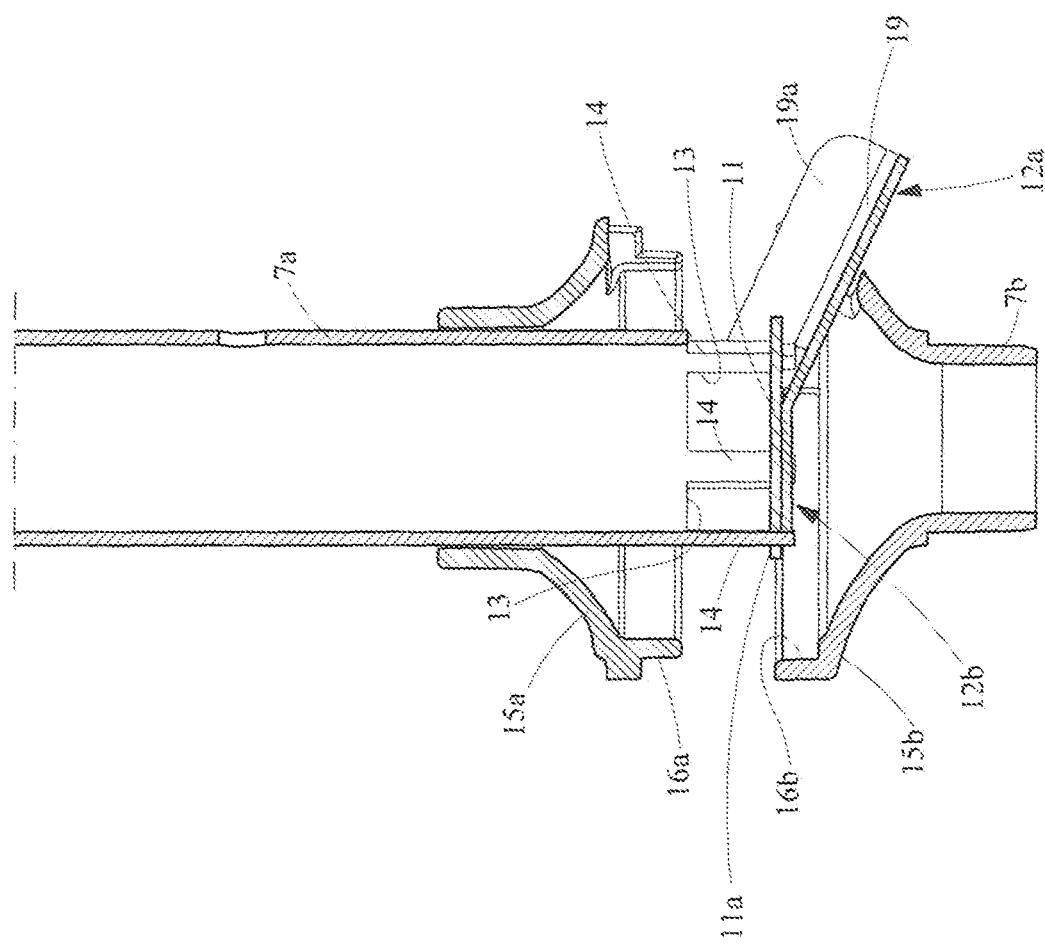
FIG. 4 is an enlarged view in axial section of the detail of FIG. 2.

The oven 3 is of the type comprising fan means for the recirculation of air inside the cooking chamber. With reference to FIG. 1, in the described example said fan means comprise three radial impellers 4', 4", 4''' (with blades 4a) of respective electric fan units, placed in vertical superimposition one above the other, the function of these units being to create a forced air circulation capable of providing the heat exchange by convection required by the cooking processes. The oven is also provided with heat generating means, for example including electrical resistances made in the form of heating cables 5 wound in a ring around the outside of each impeller, as shown purely schematically in FIG. 1.

In the oven 3 there are also provided means for generating water vapour inside the cooking chamber 2, these means providing for the supply of a flow of water in liquid phase into the cooking chamber and the atomization of this flow, in order to facilitate the evaporation of the water caused by the heat exchange with the hot air in the oven and/or by the heating resistances.

The aforesaid atomization system causes the flow of water, supplied from an external source, to be guided to the intake area 4b of each impeller. A system of this type is described, for example, in the Italian utility model application no. PD2010U000039, filed by the present applicant.

When it enters the intake area, the water, owing to the high speed of the air and/or of the steam drawn in by the fan, is distributed fairly uniformly over the inner surfaces of the blades 4a, which, rotating at high speed, are able to atomize the water. The flow of micro-drops generated by the impact of the water on the blades is then subjected to evaporation by the heat generated inside the cooking chamber.

One of the main advantages of the device for distributing water inside the oven is that it provides a uniformity of supply of the water flow in each of the impellers provided, in order to ensure uniform air temperature conditions inside the cooking chamber.

A detailed description will now be given of a distribution device 1 according to the invention designed to supply a set of three radial impellers 4', 4" and 4'", although it is to be understood that the same inventive concepts are equally applicable to fan and atomization systems having different numbers of impellers. For example, FIG. 5 shows a version of an oven fitted with five fans, and also provided with a water distribution device according to the present invention.

FIG. 1 shows a preferred configuration of the impellers, in which they are arranged in vertical superimposition above one another with axes of rotation X parallel to one another and perpendicularly intersecting a common vertical direction, where the term "vertical" refers to the orientation relative to a theoretical "horizontal" plane on which the oven rests on the ground.

The device 1 comprises a tubular conduit 6 for supplying the flow of water to be atomized, this conduit extending from one of its ends 6a (placed in the uppermost area of the cooking chamber 2) which is connectable to an external supply source, along a first portion 7a of conduit extending to the intake area 4b of a first impeller 4', located near the uppermost area of the chamber. The first portion 7a is extended by, and in fluid communication with, a second portion 7b of conduit, which in turn extends to the intake area of a second impeller 4" positioned vertically above the first impeller 4'.

The second portion 7b of conduit is extended by, and in fluid communication with, a third portion 7c of conduit, which terminates in an end section in the intake area of a third impeller 4'" located in a position below the impeller 4".

The portions 7a, 7b and 7c of the conduit 6 are coaxial with one another and extend rectilinearly along a vertical direction which intersects the axes of rotation X of the impellers.

According to the invention, a first flow deflector device, indicated as a whole by 10, is provided between the first and the second portions 7a, 7b of conduit, and similarly a second flow deflector device is provided between the second and the third portions of conduit 7b, 7c. Since these devices are substantially identical in terms of structure, only the first deflector device 10 is described in detail below, although any structural or functional differences may be pointed out where appropriate.

The main function of the deflector 10 is to divide the flow of water supplied upstream of the deflector (relative to the direction of the flow supplied by the gravity in the vertical direction) into two distinct flows leaving the deflector, having a predetermined value (+/−a tolerance considered to be acceptable, which may be, for example, equal to +/−20%), a first of these flows being guided by the deflector to the intake area of the first impeller 4', while the second flow leaving the deflector is guided along the second portion 7b of conduit towards the underlying impeller 4" until it strikes the second deflector. By means of the second deflector 10, the incoming flow is further divided into two distinct flows directed towards the second and third impellers 4", 4'".

In greater detail, the deflector 10 comprises a disc-shaped plate 11, preferably having a flat profile and a circular shape, which is placed perpendicularly to the axial direction of the flow and in a position interposed between the facing ends of the conduit portions 7a, 7b. The plate is also placed in a centred position relative to the axis of the conduit. Because of this positioning, the flow guided along the first portion 7a strikes the surface of the plate 11 as it falls, and then falls again over the circular edge 11a of the plate towards the second conduit portion 7b.

The deflector also comprises a discharge chute 12 underlying the plate 11, in a position such that it interacts with a predetermined portion, indicated by A, of the perimetric edge 11a of the plate, so as to collect and guide the respective part of the flow which is supplied by falling on to the plate, and which passes over the predetermined portion A of the edge, thus separating the first flow which is directed towards the intake area of the first impeller.

In the configuration described here, the ratio between the first and the second flows is correlated with the ratio between the lengths of the perimetric edge profiles of the plate belonging, respectively, to the portion A (on which the falling chute is applied) and to the rest of the circumferential profile of the plate, indicated by B (where the total circumferential profile of the plate is equal to the sum of the lengths A and B).

For example, if Q denotes the total flow guided along the conduit 6, when Q is to be separated into a first flow equal to Q/5 and a second flow equal to ⅘ of Q, the ratio between the portions of circumferential arc A and B is chosen to have the corresponding value of 1 to 4. This correlation holds true in any predetermined ratio of separation between the first and second flows.

The plate 11e is conveniently supported by the first conduit portion 7a, at the free end of the latter. This end is provided with a plurality of through apertures 13 formed in the cylindrical wall of the conduit, which allow the flow falling on to the plate from the first conduit portion 7a to pass towards the second conduit portion 7b and the discharge chute 12. Conduit portions 14 are defined between these apertures, the plate 11 being attached to the free ends of these portions.

The number 15 indicates the whole of a containing body of the deflector, which is formed in two half-shells 15a, 15b that can be coupled together. The half-shells 15a, 15b are fixed to the first and second portion of conduit 7a, 7b respectively, and can be removably coupled to one another by pressure as a result of the engagement of respective profiles 16a, 16b formed at the corresponding facing ends of the half-shells.

Each half-shell conveniently has a flared profile of substantially conical shape, so that the deflector device is housed in the internal cavity of the body 15 delimited by the half-shells, with the chute 12 projecting outside the body via a through aperture 18 in the body, formed by respective recesses 18a, 18b provided in the respective half-shells 15a, 15b. Because of the shape of the body 15, and particularly because of the shape of the lower half-shell 15b, the flow falling from the plate 11 and not guided by the discharge chute 12 is guided into the second conduit portion 7b, thus preventing leaks of liquid from the supply conduit.

The discharge chute 12 conveniently comprises a channel-shaped portion 12a with a bottom surface 19 joined to a pair of opposed sides 19a, and a second portion 12b provided for the attachment of the chute to the plate 12 (by insertion, for example), the portions 12a,b extending with a predetermined inclination with respect to one another.

To provide substantially the same flow at each respective impeller, the plates 11 and/or the corresponding chutes 12 of each deflector 10 of the group of deflectors arranged in series along the conduit 6 will necessarily have different dimensions from one another, while being housed in the same containing bodies, so as to separate the flow in a suitable manner.

For example, in the configuration of FIG. 1 with three impellers, if Q is the flow supplied through the first conduit portion 7a, at the entry to the first deflector 10, then ⅓ of the flow Q is guided into the intake area of the upper impeller 4', while ⅔ of the flow Q is guided along the second conduit portion 7b to supply the second deflector 10 located below.

In this second flow deflector 10, the corresponding plate 11 and chute 12 are made to separate the flow into two equal parts, so that the flow entering the second deflector, equal to ⅔ Q, is divided into two flows of equal value (⅓ Q), one being directed to the intake area of the second impeller 4" and the other being directed along the third conduit portion 7c towards the intake area of the third impeller 4''' (at the outlet of the conduit portion 7c). Thus the device according to the invention ensures that the same flow of water is supplied to each of the three impellers, namely ⅓ of the flow Q supplied into the cooking chamber.

In the configuration of FIG. 5, in which five fans are provided, a single supply conduit 6 is provided, with four separate flow deflectors (containing respective plates 11 which differ from one another), positioned in the intake areas of the first four impellers, numbered from the uppermost part of the cooking chamber.

Starting with the first deflector located in the uppermost part of the chamber, the corresponding first plate with its chute divides the flow into ⅕ and ⅘ of the flow Q entering the deflector, sending ⅕ of the flow to the first impeller.

The second deflector, located below, divides the flow entering it into fractions of ¼ and ¾, sending ¼ of this flow to the second impeller, located below.

The third deflector, located below, divides the flow entering it into fractions of ⅓ and ⅔, sending ⅓ of this flow to the third impeller, located below.

The fourth deflector, located below, divides the flow entering it into equal fractions of ½ and ½, sending ½ of this flow to the fourth impeller, located below. The other fraction of ½ of the flow is sent from the lower terminal portion of the conduit 6 to the fifth impeller.

In this configuration, therefore, it is ensured that approximately ⅕ of the flow Q, supplied from above along the conduit 6 from the external supply source, is directed to each of the five impellers, thereby providing a balanced distribution of the flow to each of the impellers provided.

As a general rule, the deflector devices according to the invention enable the flows to be separated in such a way that the individual flows directed to the intake areas of the respective impellers of the fans are substantially equal to the total flow divided by the total number of fans in the oven.

Thus the invention resolves the proposed problem, overcoming the limitations of the known solutions and providing numerous advantages over the prior art.

A principal advantage is that, by means of the water distribution device according to the invention, the production of the water flow distribution and division line is significantly simplified, in terms of both the number and overall dimensions of the components and the plant engineering work required. Indeed, any required water distribution system can be easily and speedily established according to the number of fans present in the cooking oven, simply by using sections of rectilinear conduit and an appropriate number of flow deflectors according to the invention. Furthermore, this system will have an extremely simple layout, in which the water distribution takes place along a single vertical supply line. Because of the single supply line (connected to the external supply source), a more limited number of elements is required to control the flow supplied upstream of the distributor, the arrangement possibly being limited to the provision of a single calibration hole or aperture or a single proportional valve element for flow control.

Another advantage is that the portions of conduit and the deflector devices are easily detachable (since they are simply inserted into one another) and are therefore easy to clean. This is a significant advantage because these components may be subject to soiling during cooking.

What is claimed is:

1. A food cooking oven, comprising:
a device for distributing water inside a cooking chamber of the oven, for producing steam inside the chamber,
at least a first and a second impeller of respective electric fan units placed, respectively, one above the other in a vertical arrangement,
heating means for generating heat inside the cooking chamber,
at least one water supply line in an intake area of each corresponding fan impeller, to cause atomization of a flow of water drawn in by the impeller, as a result of impact of the water on blades of the impeller, and to cause evaporation of the atomized water as a result of thermal conditions created by the heating means in the cooking chamber,
a conduit for supplying the water to be atomized, running from a first end suitable for connection to an external supply source along a first portion of conduit extending as far as the intake area of the first impeller, the first portion being coaxially prolonged and in fluid communication with a second portion of conduit running at least as far as the intake area of the second impeller, wherein at least one flow deflector device is provided between said first and second portions of conduit, capable of dividing the flow of water which is guided along the first portion of conduit and into the at least one deflector into at least a first and a second outgoing flow from the at least one deflector, the outgoing flows having predetermined values, the first outgoing flow from the at least one deflector being guided into the intake area of the first impeller, and the second outgoing flow being guided along the second portion of conduit towards the intake area of the second impeller, so that each of the impellers is struck by a flow of water having the predetermined value, and wherein
the flow deflector device comprises:
- at least one disc-shaped plate positioned perpendicularly to an axial direction of the flow and in a location interposed between respective facing ends of the first and second portions of conduit, so that the flow guided along the first portion of conduit strikes the plate as it falls, so as to fall again over a perimetric edge of the plate towards the second portion of conduit,
- and at least one discharge chute located under the plate at a predetermined portion of the perimetric edge of the plate, to collect and guide the respective flow which is supplied by falling on to the plate and passing over the edge portion of the plate, thus separating the first flow directed towards the intake area of the first impeller.

2. An oven according to claim 1, wherein a ratio between the first and second flows supplied along the conduit is correlated with a ratio between a length of a profile of the perimetric edge portion of the plate associated with the at least one discharge chute and a length of a remainder of the profile of the perimetric edge of the plate.

3. An oven according to claim 1, wherein the plate is shaped in the form of a circular disc and the at least one chute bears on a circumferential arc of predetermined length of a total circular profile of the plate, a ratio between the first and the second flows being substantially equal to a ratio between the lengths of the circumferential arc and a remainder of the circumferential profile of the plate, so that the individual flows directed towards the intake areas of the impellers of the fans are substantially equal to the total flow divided by the total number of fans in the oven.

4. An oven according to claim 1, wherein the plate is fixed to a free end of the first portion of conduit, a plurality of through apertures being provided through the wall of the first portion of conduit at this end, thereby allowing the flow falling on to the plate from the first portion of conduit to pass towards the second portion of conduit and the at least one discharge chute.

5. An oven according to claim 1, wherein the at least one deflector device is housed in a containing body comprising a first and a second half-shell, fixed to the first and second portion of conduit respectively, and removably coupled together by engagement of respective profiles formed at corresponding facing ends of the half-shells.

6. An oven according to claim 5, wherein the at least one discharge chute is associated removably with the plate and projects outside the containing body via a through aperture provided in the body and defined by respective recesses formed in each of the half-shells.

7. An oven according to claim 6, wherein the at least one discharge chute comprises a first channel-shaped portion with a bottom surface joined to a pair of opposed sides, and a second portion for attachment of the at least one chute to the plate, the portions extending with a predetermined inclination with respect to one another.

* * * * *